United States Patent
Procops et al.

(10) Patent No.: US 10,489,360 B2
(45) Date of Patent: Nov. 26, 2019

(54) SPECIFYING AND APPLYING RULES TO DATA

(71) Applicant: Ab Initio Technology LLC, Lexington, MA (US)

(72) Inventors: Roy Leonard Procops, Winchester, MA (US); Joel Gould, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 417 days.

(21) Appl. No.: 13/653,995

(22) Filed: Oct. 17, 2012

(65) Prior Publication Data
US 2014/0108357 A1  Apr. 17, 2014

(51) Int. Cl.
*G06F 16/215* (2019.01)
*G06F 17/24* (2006.01)
*G06F 16/248* (2019.01)

(52) U.S. Cl.
CPC ......... *G06F 16/215* (2019.01); *G06F 16/248* (2019.01); *G06F 17/246* (2013.01)

(58) Field of Classification Search
None
See application file for complete search history.

(56) References Cited

U.S. PATENT DOCUMENTS

| | | | |
|---|---|---|---|
| 5,630,127 A | 5/1997 | Moore et al. | |
| 5,758,351 A | 5/1998 | Gibson et al. | |
| 5,966,072 A | 10/1999 | Stanfill et al. | |
| 6,088,702 A | 7/2000 | Plantz et al. | |

(Continued)

FOREIGN PATENT DOCUMENTS

| | | |
|---|---|---|
| EP | 2221733 | 8/2010 |
| JP | H05507376 | 10/1993 |

(Continued)

OTHER PUBLICATIONS

Harkins, Susan; "Use Excel's conditional formatting to find errors"; Feb. 16, 2008; TechRepublic; http://www.techrepublic.com/blog/microsoft-office/use-excels-conditional-formatting-to-find-errors/ ; p. 1-3.*

(Continued)

*Primary Examiner* — Tony Mahmoudi
*Assistant Examiner* — Umar Mian
(74) *Attorney, Agent, or Firm* — Occhiuti & Rohlicek LLP

(57) ABSTRACT

Validation rules are specified for validating data included in fields of elements of a dataset. Cells are rendered in a two-dimensional grid that includes: one or more subsets of the cells extending in a direction along a first axis, each associated with a respective field, and multiple subsets of the cells extending in a direction along a second axis, one or more of the subsets associated with a respective validation rule. Validation rules are applied to at least one element based on user input received from at least some of the cells. Some cells, associated with a field and a validation rule, can each include: an input element for receiving input determining whether or not the associated validation rule is applied to the associated field, and/or an indicator for indicating feedback associated with a validation result based on applying the associated validation rule to data included in the associated field.

27 Claims, 3 Drawing Sheets

(56) References Cited

U.S. PATENT DOCUMENTS

| | | | |
|---|---|---|---|
| 6,494,159 B2 | 12/2002 | Sirmalis et al. | |
| 6,633,875 B2 | 10/2003 | Brady | |
| 6,708,186 B1 | 3/2004 | Claborn et al. | |
| 6,832,366 B2 | 12/2004 | Kouznetsov et al. | |
| 6,948,154 B1* | 9/2005 | Rothermel et al. | 717/128 |
| 7,080,088 B1 | 7/2006 | Lau | |
| 7,110,924 B2 | 9/2006 | Prewett et al. | |
| 7,143,076 B2 | 11/2006 | Weinberg et al. | |
| 7,164,422 B1 | 1/2007 | Wholey, III et al. | |
| 7,167,850 B2 | 1/2007 | Stanfill | |
| 7,185,317 B2 | 2/2007 | Fish et al. | |
| 7,257,603 B2 | 8/2007 | Murman et al. | |
| 7,328,428 B2 | 2/2008 | Baugher | |
| 7,536,406 B2 | 5/2009 | Haselden et al. | |
| 7,577,724 B1 | 8/2009 | Jalagam et al. | |
| 7,661,067 B2 | 2/2010 | Chen et al. | |
| 7,689,565 B1 | 3/2010 | Gandhi et al. | |
| 7,716,630 B2 | 5/2010 | Wholey et al. | |
| 7,756,873 B2 | 7/2010 | Gould et al. | |
| 7,765,529 B1 | 7/2010 | Singh et al. | |
| 7,805,474 B2 | 9/2010 | Warshavsky et al. | |
| 7,840,949 B2 | 11/2010 | Schumacher et al. | |
| 7,853,553 B2 | 12/2010 | Lankinen et al. | |
| 7,860,863 B2 | 12/2010 | Bar-Or et al. | |
| 7,890,509 B1 | 2/2011 | Pearcy et al. | |
| 7,895,586 B2 | 2/2011 | Ozone | |
| 7,912,264 B2 | 3/2011 | Freiburger et al. | |
| 7,970,746 B2 | 6/2011 | Seshadri et al. | |
| 7,979,646 B2 | 7/2011 | Furtek et al. | |
| 8,103,704 B2 | 1/2012 | Abrams | |
| 8,255,363 B2 | 8/2012 | Johnson et al. | |
| 8,423,564 B1 | 4/2013 | Hayes | |
| 8,484,159 B2 | 7/2013 | Stanfill et al. | |
| 8,516,008 B1* | 8/2013 | Marquardt | G06F 17/30315 707/802 |
| 8,555,265 B2 | 10/2013 | Chambers et al. | |
| 9,092,639 B2 | 7/2015 | Winters et al. | |
| 9,367,586 B2 | 6/2016 | Hans et al. | |
| 2001/0007959 A1* | 7/2001 | Abdalla | 700/25 |
| 2001/0014890 A1 | 8/2001 | Liu et al. | |
| 2002/0161799 A1* | 10/2002 | Maguire et al. | 707/503 |
| 2003/0016246 A1 | 1/2003 | Singh | |
| 2003/0163441 A1* | 8/2003 | Godfredsen | G06F 17/30572 |
| 2003/0163597 A1 | 8/2003 | Hellman et al. | |
| 2004/0015783 A1 | 1/2004 | Lennon et al. | |
| 2004/0024740 A1 | 2/2004 | McGeorge | |
| 2004/0056908 A1 | 3/2004 | Bjornson et al. | |
| 2004/0088318 A1 | 5/2004 | Brady | |
| 2004/0225632 A1 | 11/2004 | Benson et al. | |
| 2004/0239681 A1 | 12/2004 | Robotham et al. | |
| 2005/0010896 A1 | 1/2005 | Meliksetian et al. | |
| 2005/0060313 A1* | 3/2005 | Naimat et al. | 707/7 |
| 2005/0060317 A1* | 3/2005 | Lott et al. | 707/10 |
| 2005/0114369 A1 | 5/2005 | Gould et al. | |
| 2005/0144189 A1 | 6/2005 | Edwards et al. | |
| 2005/0178833 A1 | 8/2005 | Kisliakov | |
| 2005/0187984 A1 | 8/2005 | Chen | |
| 2005/0234762 A1 | 10/2005 | Pinto et al. | |
| 2005/0262121 A1* | 11/2005 | Cesare et al. | 707/100 |
| 2006/0007464 A1 | 1/2006 | Percey | |
| 2006/0020570 A1 | 1/2006 | Wu | |
| 2006/0095466 A1 | 5/2006 | Stevens et al. | |
| 2006/0200739 A1 | 9/2006 | Bhatia et al. | |
| 2007/0011208 A1 | 1/2007 | Smith | |
| 2007/0027858 A1 | 2/2007 | Weinberg et al. | |
| 2007/0050750 A1 | 3/2007 | Bykov et al. | |
| 2007/0080088 A1 | 4/2007 | Trotter et al. | |
| 2007/0094060 A1 | 4/2007 | Apps et al. | |
| 2007/0136692 A1 | 6/2007 | Seymour et al. | |
| 2007/0179956 A1 | 8/2007 | Whitmyer, Jr. | |
| 2007/0198457 A1 | 8/2007 | Olenick et al. | |
| 2007/0226203 A1 | 9/2007 | Ayda et al. | |
| 2007/0239751 A1 | 10/2007 | Wei et al. | |
| 2007/0271381 A1 | 11/2007 | Wholey et al. | |
| 2007/0276787 A1 | 11/2007 | Piedmonte | |
| 2007/0294119 A1 | 12/2007 | Eicher et al. | |
| 2008/0049022 A1 | 2/2008 | Sherb et al. | |
| 2008/0126988 A1 | 5/2008 | Mudaliar | |
| 2008/0162384 A1 | 7/2008 | Kleist et al. | |
| 2008/0228697 A1 | 9/2008 | Ayda et al. | |
| 2008/0243772 A1 | 10/2008 | Fuxman et al. | |
| 2008/0243891 A1 | 10/2008 | Super et al. | |
| 2008/0256014 A1 | 10/2008 | Gould et al. | |
| 2008/0312979 A1 | 12/2008 | Lee et al. | |
| 2008/0313204 A1 | 12/2008 | Schultz et al. | |
| 2009/0083313 A1 | 3/2009 | Stanfill et al. | |
| 2009/0094291 A1 | 4/2009 | Yalamanchi | |
| 2009/0234623 A1 | 9/2009 | Germain et al. | |
| 2009/0319494 A1 | 12/2009 | Gooder | |
| 2009/0327196 A1 | 12/2009 | Studer et al. | |
| 2010/0100220 A1 | 4/2010 | Belanger et al. | |
| 2010/0114833 A1 | 5/2010 | Mu | |
| 2010/0121890 A1 | 5/2010 | Perkins et al. | |
| 2010/0138388 A1 | 6/2010 | Wakeling et al. | |
| 2010/0145914 A1 | 6/2010 | Kanno et al. | |
| 2010/0198769 A1 | 8/2010 | Gould et al. | |
| 2010/0223218 A1 | 9/2010 | Prendergast | |
| 2011/0061057 A1 | 3/2011 | Harris et al. | |
| 2011/0066602 A1 | 3/2011 | Studer et al. | |
| 2011/0145297 A1 | 6/2011 | Singh | |
| 2011/0153667 A1 | 6/2011 | Parmenter et al. | |
| 2011/0295863 A1 | 12/2011 | Weir et al. | |
| 2012/0054164 A1 | 3/2012 | Falkebo et al. | |
| 2012/0102029 A1 | 4/2012 | Larson et al. | |
| 2012/0158625 A1 | 6/2012 | Nelke et al. | |
| 2012/0167112 A1 | 6/2012 | Harris et al. | |
| 2012/0185449 A1 | 7/2012 | Gould et al. | |
| 2013/0166515 A1* | 6/2013 | Kung | G06Q 10/063 707/690 |
| 2014/0108357 A1 | 4/2014 | Procops et al. | |

FOREIGN PATENT DOCUMENTS

| | | |
|---|---|---|
| JP | H07044368 | 2/1995 |
| JP | 11-143755 | 5/1999 |
| JP | 2002279147 | 9/2002 |
| JP | 2006113810 | 4/2006 |
| JP | 2006/277624 | 10/2006 |
| JP | 2008524671 | 7/2008 |
| JP | 2008547134 | 12/2008 |
| JP | 2011090598 | 6/2011 |
| WO | 20100056867 | 5/2010 |
| WO | 2010065511 | 6/2010 |
| WO | 20110035039 | 3/2011 |
| WO | 20110060257 | 5/2011 |
| WO | 20120097278 | 7/2012 |

OTHER PUBLICATIONS

Melia, Mark et al., "Constraint-Based Validation of Adaptive e-Learning Courseware," IEEE Transactions on Learning Technologies, vol. 2, No. 1, Jan.-Mar. 2009, pp. 37-49.

Rull, Guillem et al., "MVT: A Schema Mapping Validation Tool," EDBT'09, Mar. 24-26, 2009, pp. 1120-1123.

Van Megen, Rudolf et al., "Costs and benefits of early defect detection: experiences from developing client server and host applications." Software Quality Journal 4, 247-256 (1995).

Liskin, Miriam "Microsoft Access 97 for Windows SuperGuide" *Ziff-Davis Press*, Jan. 1, 1997, ch. 4 & 15, pp. 117-157 and 687-739.

Chaiken et al., "Xope: easy and efficient parallel processing of massive data sets," J. Proc. of the VLDB Endowment VLDB Endowment Hompagearchive, vol. 1, No. 2, (2008), pp. 1265-1276.

Pinheiro et al., "Mobile agents for aggregation of network management data," Agent Systems and Applications, (1999) pp. 130-140.

English Translation of Notice of Reasons for Rejection, Japanese Application No. 2011-539631, dated Oct. 28, 2013 (3 pages).

U.S. Appl. No. 12/883,721, filed Sep. 16, 2010, Mapping Dataset Elements.

U.S. Appl. No. 12/628,521, filed Dec. 1, 2009, Mapping Instances of a Dataset Within a Data Management System.

(56) References Cited

OTHER PUBLICATIONS

U.S. Appl. No. 13/281,039, filed Oct. 25, 2011, Managing Data Set Objects.
U.S. Appl. No. 13/350,191, filed Jan. 13, 2012, Managing Changes to Collections of Data.

* cited by examiner

FIG. 3

SPECIFYING AND APPLYING RULES TO DATA

BACKGROUND

This description relates to specifying and applying rules to data.

Many modern applications, including business applications, process large sets of data (i.e., "datasets") which may be compiled from various sources. The various sources that provide data to the dataset may have different levels of data quality. To ensure that the applications function properly, an adequate level of data quality in the dataset should be maintained. To maintain an adequate level of data quality, the dataset can be processed by a data validation system. Such a system applies validation rules to the dataset before it is provided to the application. In some examples, the data validation system uses the results of validation rules to calculate a measure of data quality and alert an administrator of the application if the measure of data quality falls below a predetermined threshold. In other examples, the data validation system includes modules for handling data that fails one or more of the validation rules. For example, the data validation system may discard or repair data that fails one or more of the validation rules.

In general, the validation rules applied by the data validation system are defined by an administrator of the data validation system.

SUMMARY

In one aspect, in general, a computing system specifies one or more validation rules for validating data included in one or more fields of each element of a plurality of elements of a dataset. The computing system includes a user interface module configured to render a plurality of cells arranged in a two-dimensional grid having a first axis and a second axis. The two-dimensional grid includes: one or more subsets of the cells extending in a direction along the first axis of the two-dimensional grid, each subset of the one or more subsets associated with a respective field of an element of the plurality of elements of the dataset, and multiple subsets of the cells extending in a direction along the second axis of the two-dimensional grid, one or more of the multiple subsets associated with a respective validation rule. The computing system also includes a processing module configured to apply validation rules to at least one element of the dataset based on user input received from at least some of the cells. In some implementations, at least some cells, associated with a field and a validation rule, each include an input element for receiving input determining whether or not the associated validation rule is applied to the associated field. In some implementations, at least some cells, associated with a field and a validation rule, each include an indicator for indicating feedback associated with a validation result based on applying the associated validation rule to data included in the associated field of the element.

Aspects can include one or more of the following features.

Applying validation rules to data included in a first field of a first element includes: determining any selected validation rules associated with cells from a subset of cells extending in the direction along the first axis associated with the first field of the first element, based on any input received in the input elements of the cells; and determining validation results for the data included in the first field of the first element based on the selected validation rules.

The one or more subsets of the cells extending in a direction along the first axis are rows of cells.

The multiple subsets of the cells extending in a direction along the second axis are columns of cells.

The input element is configured to receive input specifying one or more validation rule parameters.

One or more of the validation rules when evaluated yield a validation result of set of at least two validation results, the validation results including a result of valid and a result of invalid.

The indicator for indicating feedback included in at least some of the cells is configured to apply shading to a cell if the validation result is a result of invalid.

The input element is further configured to determine a correctness of each of the validation rule parameters.

The at least some cells associated with a field and a validation rule each include a second indicator for displaying a result of determining a correctness of the validation rule parameters associated with the cell.

The indicator for indicating feedback includes a numeric indicator which is configured to display a number of invalid results, the number of invalid results determined by applying the associated validation rule to data included in the associated field for all of the elements of the dataset.

The dataset includes one or more tables of a database and the elements of the dataset include database records.

One or more of the validation rules are user defined.

One or more of the validation rules are predefined.

One or more of the multiple subsets of the cells extending in the direction along the second axis of the two-dimensional grid includes a first cell associated with a first validation rule and a second cell associated with a second validation rule, the second validation rule different from the first validation rule.

One or more of the multiple subsets of the cells extending in the direction along the second axis of the two-dimensional grid includes a subset of cells that include an input element for receiving a value to replace an existing value in a corresponding field in response to a result of invalid for one of the validation rules applied to the existing value.

One or more of the multiple subsets of the cells extending in the direction along the second axis of the two-dimensional grid includes a subset of cells that include an input element for receiving an excluded value, such that the excluded value appearing in a corresponding field results in preventing validation rules from being applied to the existing value.

In another aspect, in general, a computing system specifies one or more validation rules for validating data included in one or more fields of each element of a plurality of elements of a dataset. The computing system includes means for rendering a plurality of cells arranged in a two-dimensional grid having a first axis and a second axis. The two-dimensional grid includes: one or more subsets of the cells extending in a direction along the first axis of the two-dimensional grid, each subset of the one or more subsets associated with a respective field of an element of the plurality of elements of the dataset, and multiple subsets of the cells extending in a direction along the second axis of the two-dimensional grid, one or more of the multiple subsets associated with a respective validation rule. The computing system also includes means for applying validation rules to at least one element of the dataset based on user input received from at least some of the cells. In some implementations, at least some cells, associated with a field and a validation rule, each include an input element for receiving input determining whether or not the associated validation rule is applied to the associated field. In some implementations, at least some cells, associated with a field and a validation rule, each include an indicator for indicating feedback associated with a validation result based on applying the associated validation rule to data included in the associated field of the element.

In another aspect, a method specifies one or more validation rules for validating data included in one or more fields of each element of a plurality of elements of a dataset. The method includes: rendering, by a user interface module, a plurality of cells arranged in a two-dimensional grid having a first axis and a second axis. The two-dimensional grid includes: one or more subsets of the cells extending in a direction along the first axis of the two-dimensional grid, each subset of the one or more subsets associated with a respective field of an element of the plurality of elements of the dataset, and multiple subsets of the cells extending in a direction along the second axis of the two-dimensional grid, one or more of the multiple subsets associated with a respective validation rule. The method also includes applying, by at least one processor, validation rules to at least one element of the dataset based on user input received from at least some of the cells. In some implementations, at least some cells, associated with a field and a validation rule, each include an input element for receiving input determining whether or not the associated validation rule is applied to the associated field. In some implementations, at least some cells, associated with a field and a validation rule, each include an indicator for indicating feedback associated with a validation result based on applying the associated validation rule to data included in the associated field of the element.

In another aspect, in general, a computer program, stored on a computer-readable storage medium, specifies one or more validation rules for validating data included in one or more fields of each element of a plurality of elements of a dataset. The computer program includes instructions for causing a computer system to render a plurality of cells arranged in a two-dimensional grid having a first axis and a second axis. The two-dimensional grid includes: one or more subsets of the cells extending in a direction along the first axis of the two-dimensional grid, each subset of the one or more subsets associated with a respective field of an element of the plurality of elements of the dataset, and multiple subsets of the cells extending in a direction along the second axis of the two-dimensional grid, one or more of the multiple subsets associated with a respective validation rule. The computer program also includes instructions for causing the computer system to apply validation rules to at least one element of the dataset based on user input received from at least some of the cells. In some implementations, at least some cells, associated with a field and a validation rule, each include an input element for receiving input determining whether or not the associated validation rule is applied to the associated field. In some implementations, at least some cells, associated with a field and a validation rule, each include an indicator for indicating feedback associated with a validation result based on applying the associated validation rule to data included in the associated field of the element.

Aspects can have one or more of the following advantages.

Among other advantages, the user interface can provide live feedback of the results of applying the rules to a single data element of a dataset as the rules are entered. In this way, the user can test the effectiveness of their rules without having to apply the rules to the entire dataset (a potentially time consuming process).

The user interface allows a user to run the specified rules over a dataset and receive feedback regarding the performance of each of the specified rules over the entire dataset. The user then has an opportunity to modify any of the specified rules that do not meet the expectations of the user.

The user interface allows a user to quickly and intuitively specify and modify rules, saving time and resources.

Other features and advantages of the invention will become apparent from the following description, and from the claims.

DESCRIPTION OF DRAWINGS

FIG. 3 is a screen capture of the user interface for specifying validation rules.

DESCRIPTION

Figure 1:
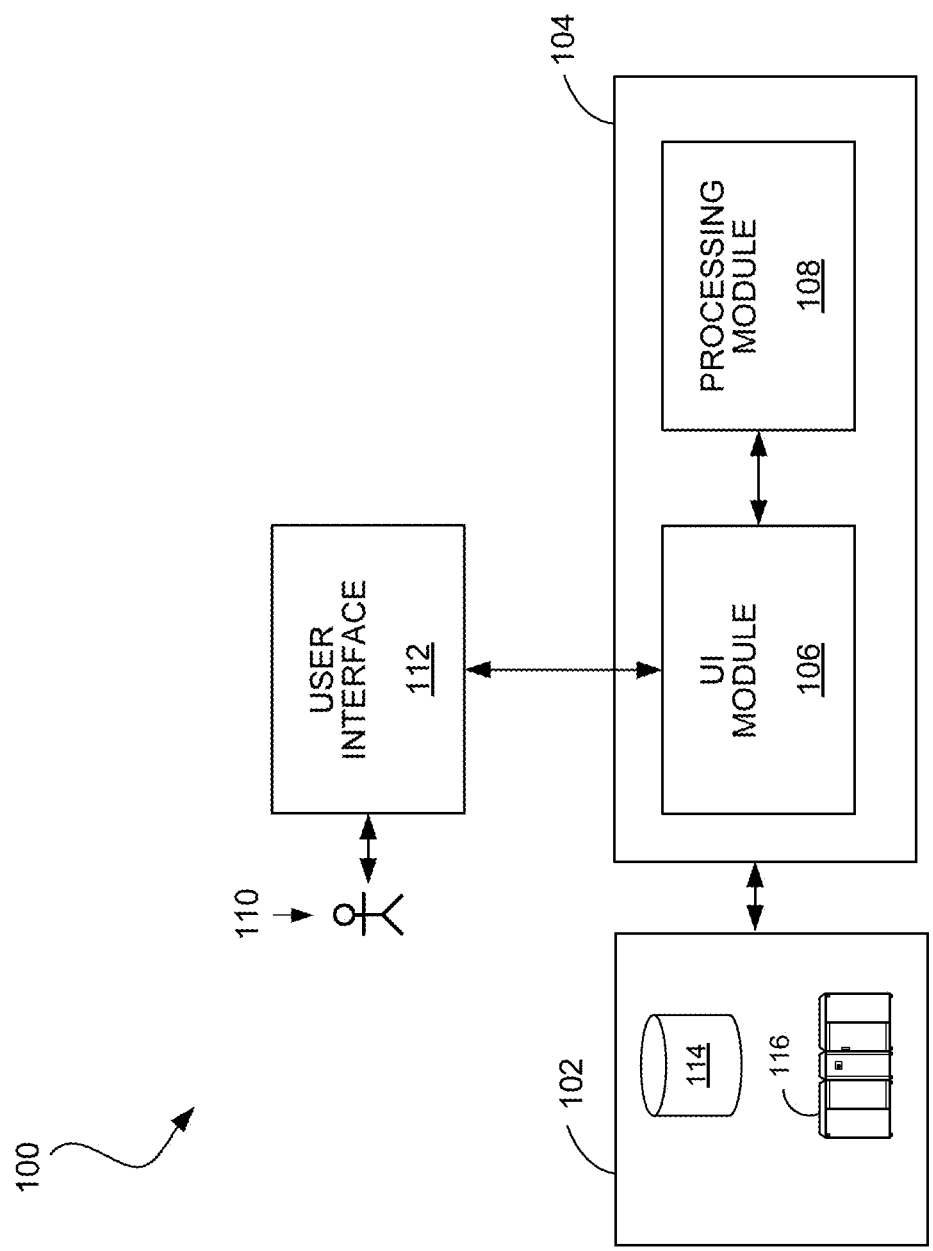
FIG. 1 is a block diagram of a system for specifying validation rules for validating data.

FIG. 1 shows an exemplary data processing system 100 in which the validation techniques can be used. The system 100 includes a data source 102 that may include one or more sources of data such as storage devices or connections to online data streams, each of which may store data (sometimes referred to as a "dataset") in any of a variety of storage formats (e.g., database tables, spreadsheet files, flat text files, or a native format used by a mainframe). An execution environment 104 includes a user interface (UI) module 106 and a processing module 108. The UI module 106 manages input received from a user 110 over a user interface 112 (e.g., a graphical view on a display screen) for specifying validation rules to be used by the processing module 108 for processing data from the data source 102.

The execution environment 104 may be hosted on one or more general-purpose computers under the control of a suitable operating system, such as the UNIX operating system. For example, the execution environment 104 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remote, or remotely distributed (e.g., multiple processors coupled via a local area network (LAN) and/or wide-area network (WAN)), or any combination thereof.

The processing module 108 reads data from the data source 102 and performs validation procedures based on validation information obtained by the UI module 106. Storage devices providing the data source 102 may be local to the execution environment 104, for example, being stored on a storage medium connected to a computer running the execution environment 104 (e.g., hard drive 114), or may be remote to the execution environment 104, for example, being hosted on a remote system (e.g., mainframe 116) in communication with a computer running the execution environment 104, over a remote connection.

In general, a dataset accessed from the data source 102 includes a number of data elements (e.g., records formatted according to a predetermined record structure, or rows in a database table). Each element of the number of data elements can include values for a number of fields (e.g., attributes defined within a record structure, or columns in a database table) (e.g., "first name," "last name," "email address," etc.), possibly including null or empty values.

Various characteristics of values in the fields (e.g., related to content or data type), or the presence or absence of values in certain fields, may be considered valid or invalid. For example, a "last name" field including the string "Smith" may be considered valid, while a "last name" field that is blank may be considered invalid.

The performance of an application that utilizes the dataset from the data source 102 may be adversely affected if the dataset includes a significant number of data elements with one or more invalid fields. The processing module 108 performs data validation procedures, including applying data validation rules to the dataset, to ensure that the dataset meets a quality constraint defined by validation rules. The data processing system 100 alerts a system administrator if the quality of the dataset fails to meet the quality constraint. In some examples, the processing module 108 may be configured to repair invalid data, if possible, or perform various data cleansing procedures to generate a dataset of cleansed data elements. In yet other examples, the processing module 108 may be configured to generate a list of fields that include invalid data from which reports can be generated. In some examples, the reports include a count of records that included invalid data for one or more of the fields in the list of fields. In other examples, aggregations of invalid fields are calculated from the list of fields.

In general, different applications process different types of data. Thus, depending on the application, the elements of the dataset may include different fields. The UI module 106 provides the user interface 112, which enables a set of validation rules to be specified and used to validate the dataset. The user interface 112 is able to provide a single view including multiple fields of a particular data element structure (in some implementations, all the available fields). Thus, for a given application, the user 110 (e.g., a system administrator) is able to specify appropriate validation rules for the data.

1 Validation User Interface

Figure 2:
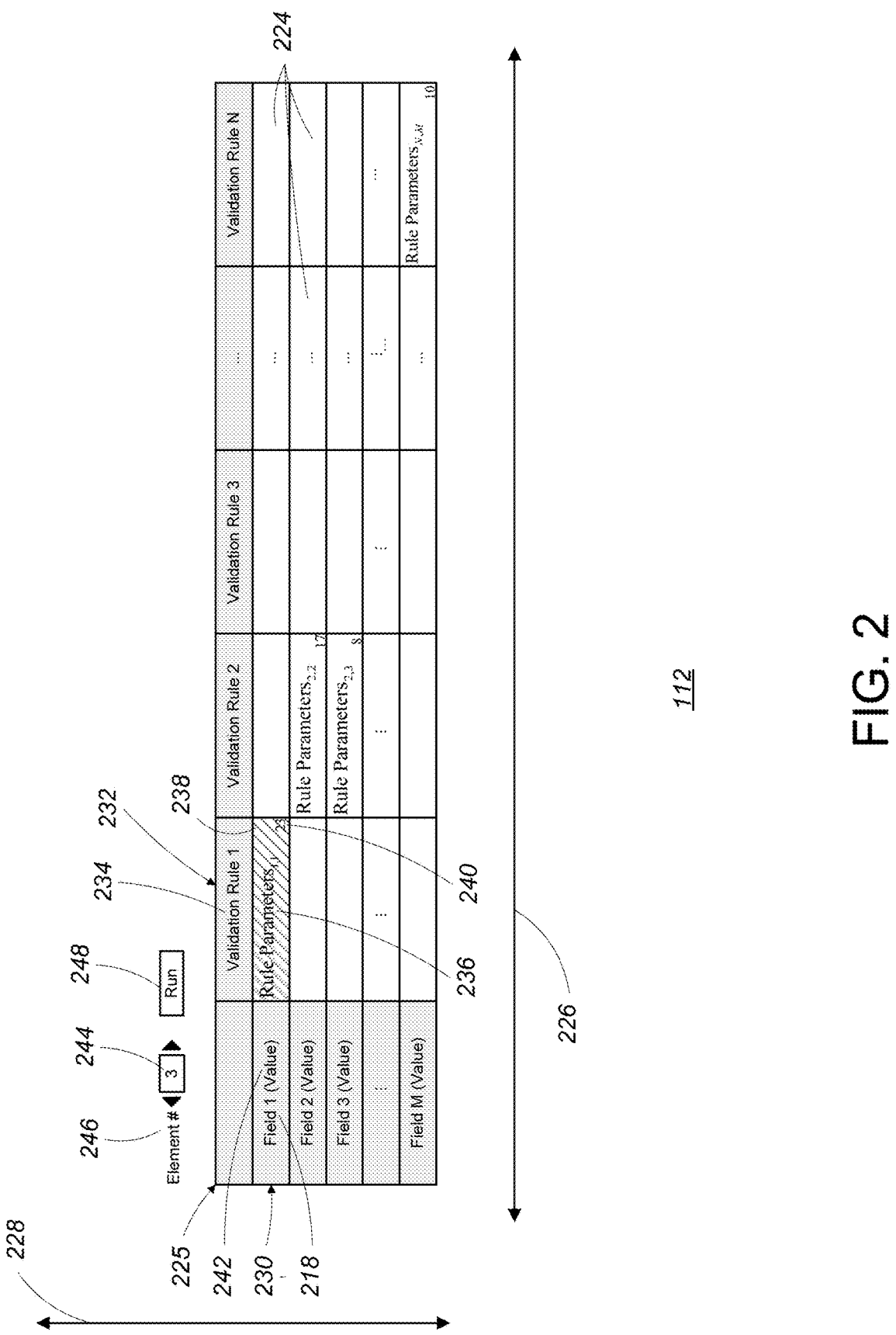
FIG. 2 is a user interface for specifying validation rules for validating data.

Referring to FIG. 2, one example of the user interface 112 is configured to facilitate the user 110 specifying and verifying one or more validation rules for validating the dataset.

1.1 Validation Rule Specification

The UI module 106 renders the user interface 112 (e.g., on a computer monitor) including a number of cells 224 arranged in a two-dimensional grid 225 having a first axis 226 and a second axis, 228. One or more subsets 230 of the cells 224 (i.e., referred to as rows 230 in the remainder of the detailed description) extends in a direction along the first axis 226 of the two-dimensional grid 225. Each of the rows 230 is associated with a field 218. In some examples, the first (i.e., leftmost) cell of each of the rows 230 includes the name of the field 218 associated with the row 230 (in this example, the field names are "Field 1," "Field 2," . . . "Field M").

Multiple subsets 232 of the cells 224 (i.e., referred to as columns 232 in the remainder of the detailed description) extend in a direction along the second axis 228 of the two-dimensional grid 225. One or more of the columns 232 is associated with a respective validation rule 234. In some examples, the first (i.e., the topmost) cell of each of the columns 232 includes the name of the validation rule 234 associated with the column 232 (in this example, the validation rule names are "Validation Rule 1," "Validation Rule 2," . . . "Validation Rule N"). It is noted that in some examples, the directions of the first axis 226 and the second axis 228 can be swapped, causing the rows 230 associated with the fields 218 to become columns and the columns 232 associated with the validation rules 234 to become rows.

In some examples, the user interface 112 includes a list (not shown) of predefined validation rules. The validation rules 234 are added to the two-dimensional grid 225, for example, by the user 110 dragging one or more of the pre-defined validation rules into the two-dimensional grid 225, or double-clicking one of the pre-defined validation rules, resulting in one or more new columns 232 being added to the grid 225. The pre-defined validation rules have a built-in function, which may accept a pre-defined set of parameters as input that can be provided within a corresponding cell. For many situations, the pre-defined list of validation rules is sufficient for the user's 110 needs. However, in some examples, as is described below, the user 110 can define custom validation rules which can also be added as columns 232 to the two-dimensional grid 225.

After one or more validation rule columns 232 are added to the two-dimensional grid 225, the user 110 can specify which validation rules 234 should be applied to which fields 218. To specify that a given validation rule 234 should be applied to a given field 218, the user 110 first selects a cell 224 where the row 230 associated with the given field 218 intersects with the column 232 associated with the given validation rule 234. The user 110 then enters one or more validation rule parameters 236 in an input element (e.g., a text field or check box) of the selected cell 224. In general, the inclusion of a rule parameter 236 in a cell potentially serves two purposes. The first purpose is to provide "configuration input" to configure the validation rule 234, and the second purpose is to indicate that the given validation rule 234 should be applied to the given field 218. It follows that if a cell 224 does not include validation rule parameters 236 (i.e., the cell is left blank), the processing module 108 does not apply the validation rule 234 associated with the cell 224 to the field 218 associated with the cell 224.

Many different types of rule parameters 236 can be entered in to the cells 224. In some cases, no configuration input is needed to configure a rule, so the rule parameter 236 may simply be a "confirmation input" rule parameter that confirms that a corresponding validation rule is to be applied. For example, one example of an input element for receiving a confirmation input rule parameter is a checkbox which, when checked, indicates that the validation rule 234 associated with a cell 224 should be applied to the field 218 associated with the cell 224. Examples of various types of validation rules are presented in the following list, which indicates whether or not the validation rule is configured by configuration input:

Integer—validates that the filed contains only integer numbers (no configuration input needed).

Invalid Values—validates that the field does not contain user specified invalid values (provided as configuration input).

Max Precision—Validates that the field has no more than a user specified number of digits (provided as configuration input) after the decimal point.

Maximum—Invalid if the field value is greater than a user specified value (provided as configuration input).

Maximum Length—Validates that the field has no more than a user specified number of characters or bytes (provided as configuration input).

Minimum—Invalid if the field is less than a user specified value (provided as configuration input).

Not Blank—Invalid if the field is empty or contains only blanks (no configuration input needed).

Not Null—Invalid if the field is null (provided as configuration input needed).

Pattern—Validates that a string field as the specified pattern (provided as configuration input).

Valid Values—Validates that the field contains only user specified valid values (provided as configuration input).

Valid for Type—Validates that the field data is valid for its type (no configuration input needed).

It is noted that the above list of validation rules is not necessarily comprehensive.

1.2 Validation Rule Verification

In some examples, the UI module 106 provides feedback to the user 110 through the user interface 112 by displaying results of the processing module 108 applying the user-specified validation rules 234 to at least some of the elements of the dataset.

The user interface 112 shown in FIG. 2 is configured to display the values 242 of the fields 218 for a given element 244 of the dataset. As the user specifies (and/or modifies) validation rules 234 and their associated parameters 236, the processing module 108 automatically applies the specified validation rules 234 to the values 242 of the fields 218 of the given data element 244 and provides the results of applying the validation rules 234 to the UI module 106, which in turn presents the results in the user interface 112 as feedback to the user 110. In general, the result of applying a validation rule is a pass/fail result. Such a pass/fail result can be indicated to the user 110 by, for example, filling the appropriate cell with a certain color, pattern, or shading. In FIG. 2, the cell associated with field 1 and validation rule 1 includes gray shading 238, indicating that the value of field 1 failed validation rule 1. In other examples, a pass/fail result can be indicated to the user 100 by the inclusion/exclusion of an indicator icon in the appropriate cell. For example, a failing result can be indicated by including a red exclamation point icon in the cell and a passing result can be indicated by the absence of the red exclamation point icon. In some examples, an icon such as a green circle can be included in the cell to indicate a passing result.

When specifying validation rules 234, it can be useful for the user 110 to navigate through the dataset to evaluate the effect of the validation rules on different elements of the dataset. Thus, the user interface 112 includes a control 246 which allows the user to select different elements of the dataset (in this example, by entering a sequence number). As the user navigates from one element to the next, the processing module 108 automatically applies the validation rules 234 to the currently selected element.

In some examples, the user interface 112 includes a run control 248, which permits the processing module 108 to apply the specified validation rules 234 to all of the elements of the dataset. Upon completion of applying the validation rules 234 to the dataset, the processing module 108 provides the results of applying the validation rules 234 to the dataset to the UI module 106, which in turn displays the results in the user interface 112 to the user 110. In some examples, each cell 234 associated with a validation rule 234 that was applied includes a failed result count indicator 240. The failed result count indicator 240 displays the number of data elements that failed the validation rule 234 specified by the cell 224.

1.3 Mixed Columns and Custom Validation Rules

As was mentioned above, the user 110 may desire a validation rule with functionality that is not included in any of the pre-defined validation rules. In some examples, the user interface 112 includes an option for inserting one or more mixed validation rule columns into the two-dimensional grid 225. A mixed validation rule column allows the user 110 to specify a different validation rule for each cell (associated with a given field 218) included in the column. For example, one cell of the mixed validation rule column could include a 'Valid Values' test while another cell of the mixed validation rule column could include a 'Maximum' test. In general, the user 100 specifies a validation rule for a given cell of the mixed validation rule column by entering the name of the test followed by the rule parameters for the test (if the test accepts rule parameters). In general, any validation rule which can be added to the two-dimensional grid 225 as a column can be entered into a single cell of a mixed validation rule column. Some examples of the contents of cells of the mixed validation rule column are "Not Null," "Maximum(99)," and "Valid Values(VM,F)."

One advantage provided by the mixed validation rule column is that the usability of the user interface 112 is improved by more efficiently representing rarely used tests on the screen. In particular, the user 110 does not have to devote an entire column 232 of the two-dimensional grid 225 to a validation rule that only applies to a single field 218. For example, the mixed validation rule column can avoid a situation where a "Valid Email" test applies only to a single field 218 (e.g., an 'email_addr' field) but occupies an entire column 232 of the two-dimensional grid 225, thereby wasting valuable screen real estate.

In other examples, the user 110 can augment the list of pre-defined validation rules with a new, reusable, custom validation rule 234. The user interface 112 provides a template for the user 110 to define the functionality of the new validation rule 234. The user 110 defines the desired custom functionality within the bounds of the template using, for example, a programming language or an expression language, for example DML code decorated with structured comments. Upon saving the new validation rule 234, the validation rule 234 is added to the list of pre-defined validation rules. The user 110 can later use the new custom validation rule 234, for example, by dragging the validation rule from the list of validation rules into the two-dimensional grid 225 or by double-clicking the validation rule. As is the case with the pre-defined validation rules, dragging the new validation rule into the grid 225 or double-clicking the new validation rule causes a new column 232 to be added to the grid 225, the new column 232 associated with the new validation rule.

Validation rules, whether pre-defined or custom validation rules, may have an attribute indicating whether the rule should be applied to null values or blank values. If the rules specifies it should not be applied to null values, the value is first tested for null, and then if null the rule is not applied, or if not null the rule is applied. If the rule specifies it should not be applied to blank values, the value is first tested to see if it is blank, and the rule is only applied if the value was found to be not blank.

Validation rules, whether pre-defined or custom, may have attributes indicating logic that can be used to determine the whether a set of rule parameters 236 entered in a cell 224 are valid for the validation rule. For example, the user interface 112 uses this logic to determine the correctness of each set of rule parameters 236 entered in a cell 224, and if the rule parameters are determined to be incorrect (e.g., due to a syntax error), and an indicator (for example a red stop sign) is displayed in the cell, and an error message determined by the logic is displayed (for example in a list of errors, or as a hover tooltip when hovering over the cell). Another example of checking the correctness of a rule parameter is checking semantics, such as checking that a specified lookup file identifier has in fact been made known to the processing module 108.

1.4 Pre-Processing or Post-Processing Columns

In some examples, the user interface 112 may include a pre-processing column, which can be used to apply any initial processing to values in a field, or to specify any particular values to be handled differently by validation rules of other columns. The user interface 112 may also include a post-processing column, which can be used to apply any actions in response to results of a test performed by a validation rule. A pre-processing column can be used, for example, to allow the user 110 to specify values to be excluded from validation, and validation data types for one or more of the fields 218. A post-processing column can be used, for example, to allow the user 110 to specify replacement values to replace existing values in an element (e.g., to replace different types of invalid values with appropriate replacement values).

In general, a replacement value is entered into a single cell of the post-processing column and is associated with a given field 218. The replacement value replaces the value 242 of the given field 218 when one or more validation rules 236 associated with the given field 218 fails. For example, if a 'start_date' field is associated with two validation rules, Minimum(1900-01-01) and Maximum(2011-12-31), one example of a replacement value is 1970-01-01. Thus, if the value of the 'start_date' field for a given record is below the minimum (i.e., before 1900-01-01) or above the maximum (i.e., later than 2011-12-31), the value is replaced with the replacement value, 1970-01-01. Other types of replacement values such as strings, date/times, etc. can also be specified in the post-processing column.

As is noted above, the user 110 can also specify one or more values to be excluded from validation in an excluded value type pre-processing column. For example, valid data for a field such as 'end_date' generally includes only date information (e.g., 1900-01-01). However, in some applications it may be desirable to also specify that another value such as "ACTIVE" is also valid data for the 'end_date' field. This can be done by entering the string "ACTIVE" into the excluded value type pre-processing column, indicating that the value "ACTIVE" is always allowable for the 'start_date' field and that the validation rules do not need to be applied to the specified excluded value.

A pre-processing column can also include a validation type column that specifies a validation data type for one or more of the fields 218. In some examples, the user 110 can enter a DML type declaration which is used to validate a field. For example, if a field 218 includes a string value that represents a date, the user 110 can enter DATE('YYYY-MM-DD') so specify that the string value actually represents a date data type and therefore should be validated as such. Similarly, to validate a string as a decimal number, the user 110 can enter decimal(' ').

1.5 Example User Interface

Figure 3:
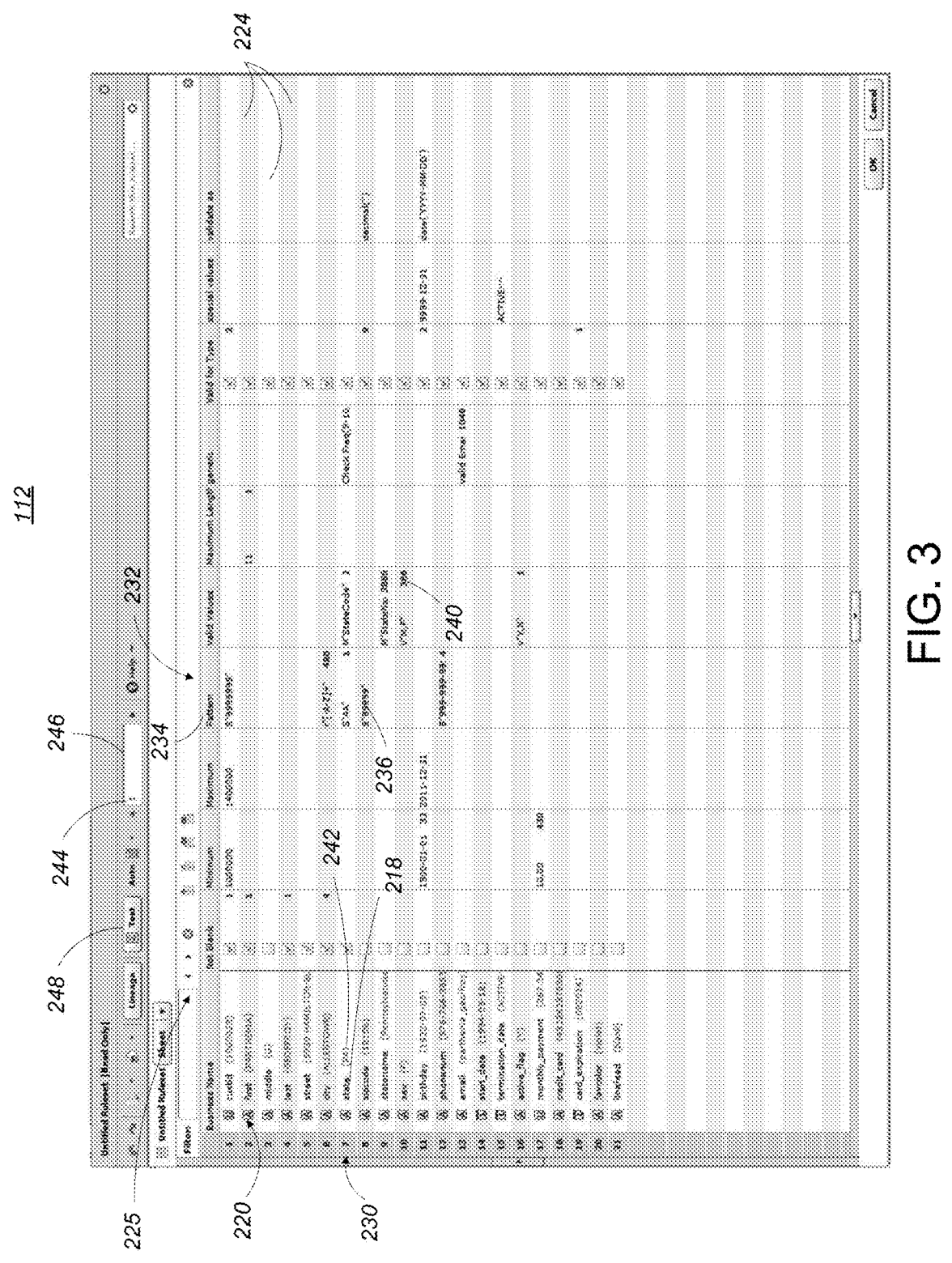

Referring to FIG. 3, a screen capture illustrates one implementation of the user interface 112 of FIG. 2. The user interface 112 is configured to allow a user 110 to specify validation rules 234 for a dataset while receiving validation rule feedback.

As is described above, the user interface 112 includes a two-dimensional grid 225 of cells 224. The grid 225 includes a number of rows 230 associated with fields 218 of the data elements of the dataset. The first cell of each of the rows 230 includes the name of the field 218 associated with the row 230 and, in parentheses, the value 242 of the field 218 for a currently selected data element 244 of the dataset. Other information about the field can also be displayed visually, to aid in a user specifying validation rules. In this example, the first cell also includes an icon 220 that visually indicates a data type of the values of the field 218.

In FIG. 3, the user 110 has added a number of validation rules 234 to the grid 225. The validation rules 234 appear in the grid as a number of columns 232. The name of each validation rule 234 is included at the top of the column 232 associated with the validation rule 234 (e.g., "Maximum Length," "Not Blank," "Pattern," etc.).

The user 110 has specified that selected validation rules 234 should be applied to one or more fields 218 of the elements of the dataset. To do so, for each validation rule 234 to be applied, the user 110 has entered a rule parameter 236 at the intersection of the column 232 associated with the validation rule 234 and the row(s) 230 associated with the field(s) 218 to which the validation rule 234 should be applied. For example, the user 110 has entered the rule parameter S"99999" at the intersection of the "Pattern" validation rule and the 'zipcode' field. The entered rule parameter configures the "Pattern" validation rule to evaluate the 'zipcode' field of each element of the dataset to determine if the value of the 'zipcode' field of each of the elements is a string with a pattern of five consecutive numeric characters. Similarly, the "Pattern" validation rule is configured to evaluate the 'phonenum' field of each element of the dataset to determine if the value 242 of the 'phonenum' field of each element is a string with a pattern of S"999-999-9999" (i.e., three numeric characters, a dash, three more numeric characters, a dash, and four more numeric characters).

Other types of validation rules 234 and rule parameters are also illustrated in FIG. 3. For example, a "Valid Values" validation rule is applied to the 'statename' field with a rule parameter of M"StateNames" which identifies the valid values for the 'statename' field as the set of state names for the United States of America. The 'M' before "StateNames" in the rule parameter above indicates that the set of state names is defined (e.g., by the user 110 or a system administrator) as a separate dataset (sometimes referred to as a codeset), which is stored in a metadata reference system that is accessible in the execution environment 104. In this example, the dataset including the state names is referred to by the variable name "StateNames."

In some examples, a codeset is stored in a lookup table. To access the codeset in the lookup table, the rule parameter is entered as, for example, L"StateNames" indicating that a lookup file identified to the system with the name "StateNames" is the source of valid 'statename' values. In yet other examples, the user 110 can directly enter the set of valid values. For example, the valid set of gender codes can be entered as V"M,F,U". Another, "Not Blank," validation rule is applied to a number of the fields. For example, the "Not Blank" validation rule is applied to the 'street' field due to the presence of a check mark rule parameter in the cell at the intersection of the "Not Blank" rule parameter column and the 'street' field row.

As is described above, the user interface 112 is able to display all of the values 242 of the fields 218 for a given element 244 to the user 110. The UI module 106 also receives input from the user interface 112 that causes the processing module 108 to execute some or all of the validation rules 234 associated with the fields 218 of the element 244. The result(s) generated by the processing module 108 are provided to the UI module 106, which in turn displays feedback based on the result(s) to the user 110 in the user interface 112. In FIG. 3, the "Valid Values" validation rule is applied to the 'statename' field to test whether the value of the 'statename' field is a member of the set of state names.

From inspection, one can see that the value of the 'statename' field is 'Pennsylvannia' which is a misspelling of the state name 'Pennsylvania.' Thus, the "Valid Values" validation rule fails for the 'statename' field for the given element 244. To indicate the failure of the validation rule to the user 110, the cell associated with the "Valid Values" validation rule and the 'statename' field is shaded.

The user 110 can navigate through the elements of the dataset using a navigation control 246. In some examples, navigation control 246 includes arrows, which allow the user 110 to step through the elements of the dataset one at a time, and a numeric field, which allows the user 110 to enter a dataset element number that they would like to view. Whenever the user 110 navigates to a different element using the navigation control 246, the processing module 108 executes the specified validation rules on the values of the new element, and the values 242 and other visual feedback indicating results of the validation tests (for example shading of cells) are refreshed/updated.

The user interface 112 also includes a 'Test' button 248 which, when actuated, causes the processing module 108 to execute the specified validation rules for all of the elements of the dataset. As is described above, the results of executing the specified validation rules for all of the elements of the dataset are summarized in the user interface 112 by the inclusion of a failed element count indicator 240 in each cell for which one or more elements have failed the specified validation rule. In the implementation of FIG. 3, the failed element count indicator 240 is a number that represents the number of elements of the dataset that failed the validation rule specified by the cell. For example, the failed element count indicator for the cell associated with the 'statename' field and the "Valid Values" validation rule indicates that 3886 of the elements of the dataset include a state name that is not a member of the set of valid state names. A user can click on that cell to retrieve information about elements that failed.

For each element that failed one or more validation rule test results, a collection of issue information can be aggregated over the validation issues and stored for later retrieval. For example, a list of fields for which one or more validation rules were specified can be displayed in another view, with counts of number of elements that had a validation issue for that field, including a count of zero elements if there were no validation issues for that field. This enables a user to unambiguously determine that no elements failed that particular validation rule, while also confirming that the validation rules for that field were actually performed. Stored validation issue information can also be used to compute various metrics (e.g., percentages of records that have particular quality issues), or to augment a dataset of data elements with validation issue information.

2 Alternatives

In some examples, the failed result count indicator 240 is a hyperlink which, when clicked by the user 110, causes the UI module 106 to display a window that summarizes all of the failed elements to the user 110.

In some examples, the result of applying data validation rules can be used to determine metrics of the dataset. For example, metrics can include the percentage of records of the dataset which have data quality issues. Other user interfaces which are not described herein can be used to specify and present these metrics to the user 110.

While the above description describes providing feedback to users by shading cells, other types of feedback mechanisms (e.g., sounds, pop-up windows, special symbols, etc.) can be utilized.

The above description describes specifying rules while working on a full dataset. However, in some examples, a test dataset that has a reduced and more manageable size and is representative of a full dataset can be used.

The techniques described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer, or delivered (encoded in a propagated signal) over a communication medium of a network to a storage medium of the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A computing system for specifying one or more validation rules for validating data included in one or more fields of each element of a plurality of elements of a dataset, the computing system including:
   a user interface module configured to render a plurality of cells arranged in a two-dimensional grid having a first axis and a second axis, the two-dimensional grid including
      one or more subsets of the cells extending in a direction along the first axis of the two-dimensional grid, each subset of the one or more subsets associated with a respective field of an element of the plurality of elements of the dataset, and multiple subsets of the cells extending in a direction along the second axis of the two-dimensional grid, each of one or more of the multiple subsets including a plurality of cells associated with a same validation rule; and a processing module, including at least one processor, configured to apply validation rules to at least one element of the dataset based on user input received from at least some of the cells;

wherein at least some cells, associated with a field and a validation rule, each include an input element for receiving input determining whether or not the associated validation rule is applied to the associated field, and an indicator for indicating feedback associated with a validation result based on applying the associated validation rule to data included in the associated field of the element.

2. The system of claim 1, wherein applying validation rules to data included in a first field of a first element includes:

determining any selected validation rules associated with cells from a subset of cells extending in the direction along the first axis associated with the first field of the first element, based on any input received in the input elements of the cells; and determining validation results for the data included in the first field of the first element based on the selected validation rules.

3. The system of claim 1 wherein the one or more subsets of the cells extending in a direction along the first axis are rows of cells.

4. The system of claim 1 wherein the multiple subsets of the cells extending in a direction along the second axis are columns of cells.

5. The system of claim 1 wherein the input element is configured to receive input specifying one or more validation rule parameters.

6. The system of claim 1 wherein one or more of the validation rules when evaluated yield a validation result of set of at least two validation results, the validation results including a result of valid and a result of invalid.

7. The system of claim 6 wherein the indicator for indicating feedback included in at least some of the cells is configured to apply shading to a cell if the validation result is a result of invalid.

8. The system of claim 5 wherein the input element is further configured to determine a correctness of each of the validation rule parameters.

9. The system of claim 8 wherein the at least some cells associated with a field and a validation rule each include a second indicator for displaying a result of determining a correctness of the validation rule parameters associated with the cell.

10. The system of claim 1 wherein the indicator for indicating feedback includes a numeric indicator which is configured to display a number of invalid results, the number of invalid results determined by applying the associated validation rule to data included in the associated field for all of the elements of the dataset.

11. The system of claim 1 wherein the dataset includes one or more tables of a database and the elements of the dataset include database records.

12. The system of claim 1 wherein one or more of the validation rules are user defined.

13. The system of claim 1 wherein one or more of the validation rules are predefined.

14. The system of claim 1 wherein each of one or more of the multiple subsets of the cells extending in the direction along the second axis of the two-dimensional grid includes a first cell associated with a first validation rule and a second cell associated with a second validation rule, the second validation rule different from the first validation rule.

15. The system of claim 1 wherein each of one or more of the multiple subsets of the cells extending in the direction along the second axis of the two-dimensional grid includes a subset of cells that include an input element for receiving a value to replace an existing value in a corresponding field in response to a result of invalid for one of the validation rules applied to the existing value.

16. The system of claim 1 wherein each of one or more of the multiple subsets of the cells extending in the direction along the second axis of the two-dimensional grid includes a subset of cells that include an input element for receiving an excluded value, such that the excluded value appearing in a corresponding field results in preventing validation rules from being applied to the excluded value.

17. The system of claim 5, wherein the presence of one or more validation rule parameters determines whether or not the associated validation rule is applied to the associated field.

18. The system of claim 1, wherein, for at least a first subset of cells extending in the direction along the second axis, associated with a first validation rule, at least one cell in the first subset of cells includes:

an input element for receiving input determining whether or not the first validation rule is applied to an associated field, the first validation rule defining a same constraint applied to each field associated with a respective cell in the first subset of cells, and an indicator for indicating feedback associated with a validation result based on applying the first validation rule to data included in the associated field of the element.

19. The system of claim 1, wherein each of one or more of the multiple subsets of cells extending in the direction along the second axis includes the entire subset of cells associated with the same validation rule.

20. A computing system for specifying one or more validation rules for validating data included in one or more fields of each element of a plurality of elements of a dataset, the computing system including:

means for rendering a plurality of cells arranged in a two-dimensional grid having a first axis and a second axis, the two-dimensional grid including one or more subsets of the cells extending in a direction along the first axis of the two-dimensional grid, each subset of the one or more subsets associated with a respective field of an element of the plurality of elements of the dataset, and multiple subsets of the cells extending in a direction along the second axis of the two-dimensional grid, each of one or more of the multiple subsets including a plurality of cells associated with a same validation rule; and means for applying validation rules to at least one element of the dataset based on user input received from at least some of the cells;

wherein at least some cells, associated with a field and a validation rule, each include an input element for receiving input determining whether or not the associated validation rule is applied to the associated field, and an indicator for indicating feedback associated with a validation result based on applying the associated validation rule to data included in the associated field of the element.

21. A method for specifying one or more validation rules for validating data included in one or more fields of each element of a plurality of elements of a dataset, the method including:

rendering, by a user interface module, a plurality of cells arranged in a two-dimensional grid having a first axis and a second axis, the two-dimensional grid including one or more subsets of the cells extending in a direction along the first axis of the two-dimensional grid, each subset of the one or more subsets associated with a respective field of an element of the plurality of elements of the dataset, and multiple subsets of the cells extending in a direction along the second axis of the two-dimensional grid, each of one or more of the multiple subsets including a plurality of cells associated with a same validation rule; and applying, by at least one processor, validation rules to at least one element of the dataset based on user input received from at least some of the cells;

wherein at least some cells, associated with a field and a validation rule, each include an input element for receiving input determining whether or not the associated validation rule is applied to the associated field, and an indicator for indicating feedback associated with a validation result based on applying the associated validation rule to data included in the associated field of the element.

22. A computer program, stored on a non-transitory computer-readable medium, for specifying one or more validation rules for validating data included in one or more fields of each element of a plurality of elements of a dataset, the computer program including instructions for causing a computer system to:

render a plurality of cells arranged in a two-dimensional grid having a first axis and a second axis, the two-dimensional grid including one or more subsets of the cells extending in a direction along the first axis of the two-dimensional grid, each subset of the one or more subsets associated with a respective field of an element of the plurality of elements of the dataset, and multiple subsets of the cells extending in a direction along the second axis of the two-dimensional grid, each of one or more of the multiple subsets including a plurality of cells associated with a same validation rule; and apply validation rules to at least one element of the dataset based on user input received from at least some of the cells;

wherein at least some cells, associated with a field and a validation rule, each include an input element for receiving input determining whether or not the associated validation rule is applied to the associated field, and an indicator for indicating feedback associated with a validation result based on applying the associated validation rule to data included in the associated field of the element.

23. A computing system for specifying one or more validation rules for validating data included in one or more fields of each element of a plurality of elements of a dataset, the computing system including:

a user interface module configured to render a plurality of cells arranged in a two-dimensional grid including one or more rows of the cells, each row associated with a respective field of an element of the plurality of elements of the dataset, and multiple columns of the cells, at least one pre-defined validation rule column with all of its cells associated with a pre-defined validation rule that defines a function that accepts zero or more parameters configuring the function; and at least one mixed validation rule column with a first of its cells associated with a first validation rule and a second of its cells associated with a second validation rule, the second validation rule different from the first validation rule; and a processing module, including at least one processor, configured to apply validation rules to at least one element of the dataset based on user input received from at least some of the cells;

wherein at least some cells, associated with a field and a validation rule, each include an input element for receiving input determining whether or not the associated validation rule is applied to the associated field, and an indicator for indicating feedback associated with a validation result based on applying the associated validation rule to data included in the associated field of the element.

24. The system of claim 23 wherein, for at least one pre-defined validation rule column in which the function defined by the pre-defined validation rule accepts one or more parameters, said input determining whether or not the associated validation rule is applied to the associated field includes a value of a parameter configuring the function defined by the pre-defined validation rule.

25. The system of claim 24 wherein, for at least one mixed validation rule column, said input determining whether or not the associated validation rule is applied to the associated field includes a name of a test applied by a validation rule associated with a cell of the mixed validation rule column.

26. The system of claim 23 wherein the two-dimensional grid includes a column that includes: (1) names of the respective fields associated with each of the rows, and (2) values of the respective fields for a selected element of the dataset.

27. The system of claim 26 wherein the selected element of the dataset is identified by a control rendered by the user interface module along with the two-dimensional grid.

* * * * *